United States Patent
Ward

(10) Patent No.: US 10,240,560 B2
(45) Date of Patent: Mar. 26, 2019

(54) BOOT FOR REPAIR OF CHEVRON ON NACELLE

(71) Applicant: Rohr, Inc., Chula Vista, CA (US)

(72) Inventor: Stephen H. Ward, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 856 days.

(21) Appl. No.: 14/547,857

(22) Filed: Nov. 19, 2014

(65) Prior Publication Data
US 2016/0138424 A1    May 19, 2016

(51) Int. Cl.
*B23P 6/00* (2006.01)
*F02K 1/38* (2006.01)

(52) U.S. Cl.
CPC .......... *F02K 1/386* (2013.01); *F05D 2230/80* (2013.01); *Y02T 50/672* (2013.01)

(58) Field of Classification Search
CPC ....... Y10T 428/24008; Y10T 29/49718; Y10T 29/49732; Y10T 29/49735; Y10T 29/49739; Y10T 29/49947; Y10T 29/49963; B23P 6/00; B23P 6/002; F04C 2230/80
USPC .............. 428/99; 29/402.01, 402.09, 402.12, 29/402.14, 889.1, 525.01, 525.11; 150/154
See application file for complete search history.

(56) References Cited

U.S. PATENT DOCUMENTS

| 4,064,961 | A | | 12/1977 | Tseo | |
|---|---|---|---|---|---|
| 4,916,880 | A | * | 4/1990 | Westerman, Jr. | ....... B29C 73/04 156/94 |
| 5,576,079 | A | | 11/1996 | Forman | |
| 7,216,831 | B2 | | 5/2007 | Wood | |
| 8,550,208 | B1 | | 10/2013 | Potokar | |
| 8,672,259 | B2 | | 3/2014 | Kosheleff | |
| 8,770,921 | B2 | | 7/2014 | Huber | |
| 9,764,850 | B2 | * | 9/2017 | Bradley | ................. B64D 37/02 |
| 2003/0221411 | A1 | * | 12/2003 | Nesbitt | ..................... F02K 1/46 60/204 |

(Continued)

OTHER PUBLICATIONS

Web search history conducted with Google search engine, Aug. 3, 2017.*

(Continued)

*Primary Examiner* — Sarang Afzali
*Assistant Examiner* — Darrell C Ford
(74) *Attorney, Agent, or Firm* — O'Shea Getz P.C.

(57) ABSTRACT

Aspects of the disclosure are directed to a system that includes a boot configured to attach to a chevron of an aircraft nacelle, and an attachment mechanism configured to attach the boot and the chevron. In some embodiments, a boot includes a first surface and a second surface, where the surfaces are attached by inwardly tapering sidewalls that form an opening that is configured to surround a chevron of an aircraft nacelle. In some embodiments, a repair of a chevron on an exhaust nozzle of an aircraft engine includes placing a chevron-shaped boot with a pocket over at least a portion of a chevron structure on an exhaust nozzle of an aircraft engine, the pocket having a shape that generally conforms to an external surface of the chevron, covering the portion of the chevron structure with the boot, and fastening the boot to the chevron through at least one of bonding or mechanical fastening.

14 Claims, 5 Drawing Sheets

(56) References Cited

U.S. PATENT DOCUMENTS

| | | | | |
|---|---|---|---|---|
| 2006/0101807 | A1* | 5/2006 | Wood | B64C 7/02 60/262 |
| 2009/0178410 | A1* | 7/2009 | Straza | B29D 99/0089 60/725 |
| 2009/0227162 | A1* | 9/2009 | Kruckenberg | B64D 45/02 442/1 |
| 2010/0024185 | A1* | 2/2010 | Mayabb | B29C 73/04 29/402.03 |
| 2010/0193605 | A1 | 8/2010 | Johnson | |
| 2010/0314194 | A1* | 12/2010 | Guerin | F02K 1/46 181/215 |
| 2010/0329881 | A1* | 12/2010 | Mendez Hernandez | F01D 11/00 416/230 |
| 2011/0006165 | A1* | 1/2011 | Ireland | B64C 23/06 244/200.1 |
| 2011/0139540 | A1 | 6/2011 | Caruel | |
| 2012/0328427 | A1 | 12/2012 | Holland | |
| 2013/0122763 | A1 | 5/2013 | Fish | |
| 2014/0338324 | A1* | 11/2014 | Jasklowski | F02K 1/1207 60/527 |
| 2016/0052643 | A1* | 2/2016 | Jones | B64D 45/02 244/1 A |
| 2018/0216464 | A1* | 8/2018 | Bezanson | F01D 5/005 |

OTHER PUBLICATIONS

Product Catalog: ASP Fasteners (Arconic, copyright 2017) retrieved Aug. 3, 2017.*

Greg Sweers, "Lightning Strikes: Protection, Inspection, and Repair", Boeing.com commercial aeromagazine, 2012, available at: <http://www.boeing.com/commercial/aeromagazine/articles/2012_q4/pdfs/AERO_2012q4_article4.pdf>.

Dexmet Corporation, "Lightning Strike Protection for Carbon Fiber Aircraft", Advancement of Materials Process Engineering (SAMPE) Conference Presentation, Baltimore, MD Jun. 2007, available at: <http://www.dexmet.com/1_pdf/LSP%20for%20Carbon%20Fiber%20Aircraft.pdf>.

Sara Black, "Lightning Strike Protection Strategies for Composite Aircraft", Compositeworld.com, May 1, 2013, available at: <http://www.compositesworld.com/articles/lightning-strike-protection-strategies-for-composite-aircraft>.

Sara Black, "After Lightning Strikes: Repair Considerations", Compositeworld.com, May 2, 2013, available at: <http://www.compositesworld.com/articles/after-lightning-strikes-repair-considerations>.

Ginger Gardiner, "Lightning Strike Protection for Composite Structures", Compositeworld.com, Jul. 1, 2006, available at: <http://www.compositesworld.com/articles/lightning-strike-protection-for-composite-structures>.

FAA.gov, "Chapter 7, Advanced Composite Materials", downloaded from <https://www.faa.gov/regulations_policies/handbooks_manuals/aircraft/amt_airframe_handbook/rnedia/ama_Ch07.pdf> on Aug. 19, 2014.

Wikipedia.com, "Fibre-reinforced plastic", downloaded from <http://en.wikipedia.org/wiki/Fibre-reinforced_plastic> on Nov. 11, 2014.

Wikipedia.com, "Carbon-fiber-reinforced polymer", downloaded from <http://en.wikipedia.org/wiki/Carbon-fiber-reinforced_polymer> on Nov. 11, 2014.

Thomasnet.com, "Long Glass Fiber Reinforced (LGFR) Compression Molded Composite Structures Suppliers", downloaded from <http://www.thomasnet.com/products/composite-structures-compression-molded-long-glass-fiber-reinforced-lgfr-96073861-1.html> on Nov. 11, 2014.

Staff, "Fabrication Methods", Compositeworld.com, Jan. 1, 2014, available at: <http://www.compositesworld.com/articles/fabrication-methods>.

N. Bheekhun, "Thermal Spray Coatings for Polymer Matrix Composites in Gas Turbine Engines: A Literary Preview", International Review of Aerospace Engineering (I.Re.As.E), vol. 7, N. 3, ISSN 1973-7459, Jun. 2014.

* cited by examiner

A-A

BOOT FOR REPAIR OF CHEVRON ON NACELLE

BACKGROUND

Some aircraft turbofan engine nacelles have chevron-shaped geometric features at the exit nozzle for the bypass air, e.g. on the trailing (aft) edge of a thrust reverser translating sleeve. The chevrons, which may take the form/shape of serrated edges, may be used to reduce noise by controlling the way air mixes after passing through and around an engine. These chevrons are susceptible to being struck by lightning, requiring repair prior to the next aircraft flight. The availability of a repair option and the time necessary to perform the repair will impact the availability of the aircraft, and will be a factor in the economic success of the aircraft for the operator.

This disclosure proposes a simple, effective, inexpensive and quick repair strategy for repairing a nozzle chevron, which can be performed at almost any repair facility or on the airport flight line. This repair could be used as a permanent or long-term repair, or may serve as a temporary repair to allowed continued aircraft dispatch until a more permanent repair can be performed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a boot configured to attach to a chevron of an aircraft nacelle, and an attachment mechanism configured to attach the boot and the chevron. In some embodiments, attachment mechanism includes a bonding of the boot and the chevron. In some embodiments, the attachment mechanism includes at least one fastener. In some embodiments, the attachment mechanism is configured to electrically connect the boot and the nacelle. In some embodiments, the chevron is composed of at least two laminates bonded onto a core material. In some embodiments, the boot is fabricated using an injection or compression molding of fiber reinforced plastic material. In some embodiments, the boot is fabricated via a resin transfer molding using a dry continuous fiber preform made using at least one of fabric or braided material and a thermoset resin material. In some embodiments, the boot includes at least one of a metal or a composite material. In some embodiments, the boot includes at least one of a mesh or spray coating configured to protect the boot against a lightning strike. In some embodiments, the boot is configured to encapsulate the entirety of the chevron when attached to the chevron.

Aspects of the disclosure are directed to a boot comprising: a first surface and a second surface, wherein the surfaces are attached by inwardly tapering sidewalls that form an opening that is configured to surround a chevron of an aircraft nacelle. In some embodiments, the boot is fabricated using an injection or compression molding of fiber reinforced plastic material. In some embodiments, the boot is fabricated via a resin transfer molding using a dry continuous fiber preform made using at least one of fabric or braided material and a thermoset resin material. In some embodiments, the boot includes at least one of a metal or a composite material. In some embodiments, the boot includes at least one of a mesh or spray coating configured to protect the boot against a lightning strike.

Aspects of the disclosure are directed to a method of repairing a chevron on an exhaust nozzle of an aircraft engine comprising: placing a chevron-shaped boot with a pocket over at least a portion of a chevron structure on an exhaust nozzle of an aircraft engine, the pocket having a shape that generally conforms to an external surface of the chevron, covering the portion of the chevron structure with the boot, and fastening the boot to the chevron through at least one of bonding or mechanical fastening. In some embodiments, the boot comprises an electrically conductive lightning protection feature. In some embodiments, the method further comprises joining the electrically conductive lightning protection feature of the boot to an electrically conductive lightning strike protection feature of the chevron. In some embodiments, the joining comprises an insertion of an electrically conductive fastener through each feature.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
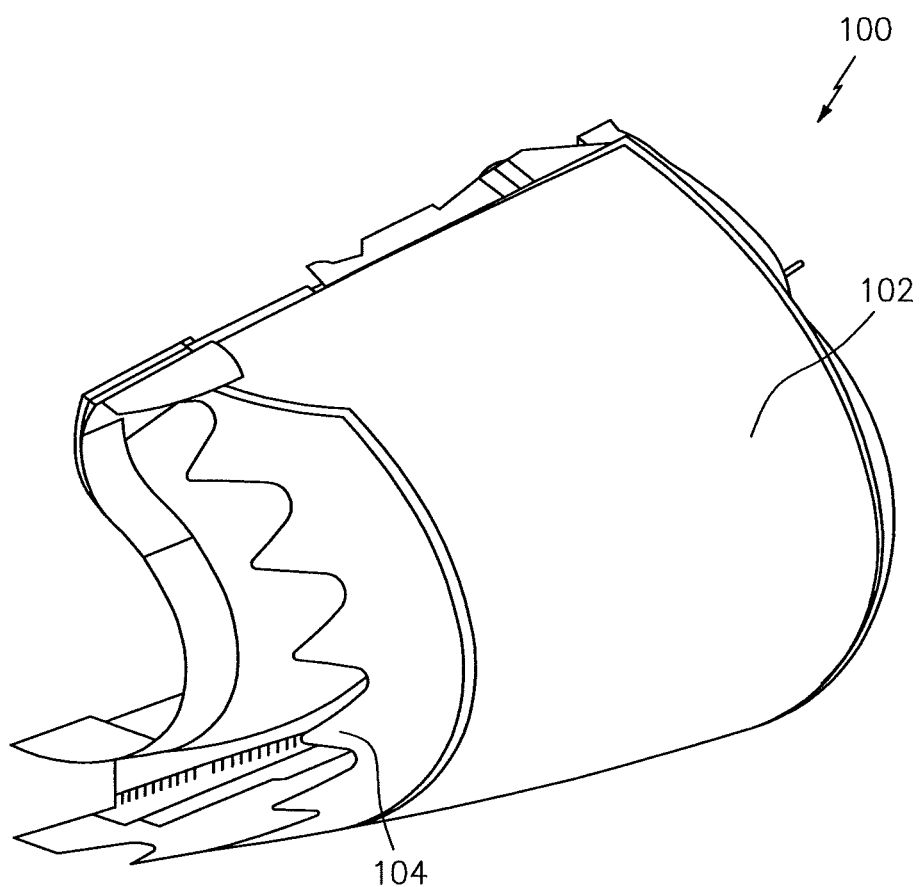
FIG. 1 illustrates a portion of a nacelle incorporating a translating sleeve and a chevron.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a boot. The boot may be used in connection with a chevron of a nacelle. In some embodiments, the boot may be used to perform a repair or maintenance activity with respect to the chevron, thereby allowing an aircraft incorporating the chevron to remain in service.

Referring to FIG. 1, a portion of a nacelle 100 is shown. The nacelle 100 may be used in connection with an aircraft to house an engine (not shown) and may include one or more components and devices associated with a thrust reverser. For example, the nacelle 100 includes a thrust reverser translating sleeve outer cowl 102. The cowl 102 may be moved in a forward (fwd) or aft direction, where the movement may be used in connection with a deployment or stowing of the thrust reverser.

Also shown in FIG. 1 is a chevron 104. The chevron 104 may be composed of two face sheets/laminates bonded onto a core material (e.g., a honeycomb core material). The chevron 104 may be used to reduce noise that would otherwise be output from the nacelle 100 in the absence of the chevron 104. However, the chevron 104 may be susceptible to a lightning strike or other impact during operation of the aircraft, potentially resulting in a delamination, e.g., a delamination of one or both of the sheets/laminates delaminating off of the core material or between ply layers.

Figure 2A:
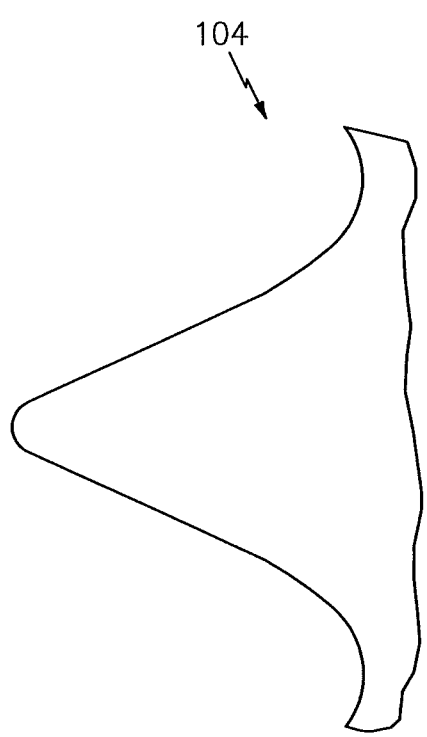
FIG. 2A illustrates a portion of the chevron of FIG. 1.
Figure 2B:
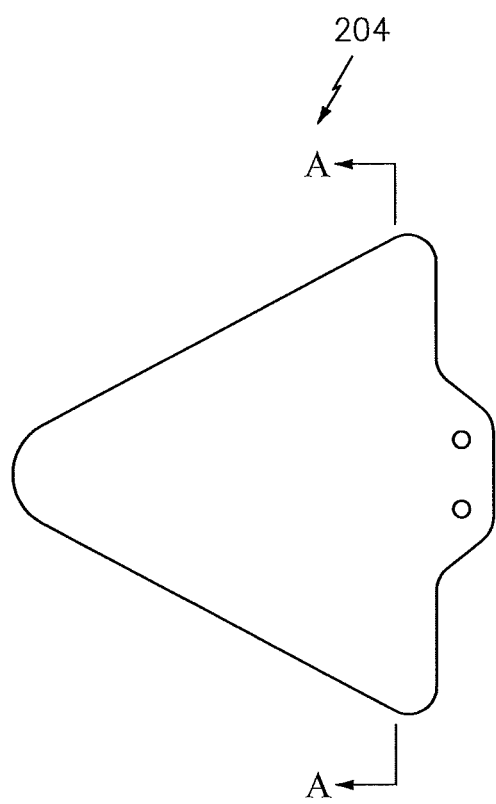
FIG. 2B illustrates an exemplary boot in accordance with aspects of the disclosure.
Figure 2C:
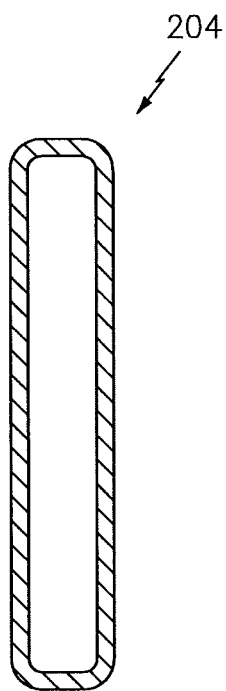
FIG. 2C illustrates a cross-sectional view of the boot of FIG. 2B.

Referring to FIG. 2A, a portion of the chevron 104 of FIG. 1 is shown. FIG. 2B illustrates a boot 204. FIG. 2C illustrates a cross-sectional view of the boot 204 about the line A-A of FIG. 2B.

In some embodiments, the boot 204 may be made in a unitary piece and may potentially cover one or several chevrons 104. In some embodiments, the boot 204 may be of a uniform thickness or may be thicker in one or more regions (e.g., at a distal tip region of the boot 204) for purposes of, e.g., lightning tolerance. Leading edges of the boot 204 may be tapered so as to promote airflow over the boot 204.

Figure 3:
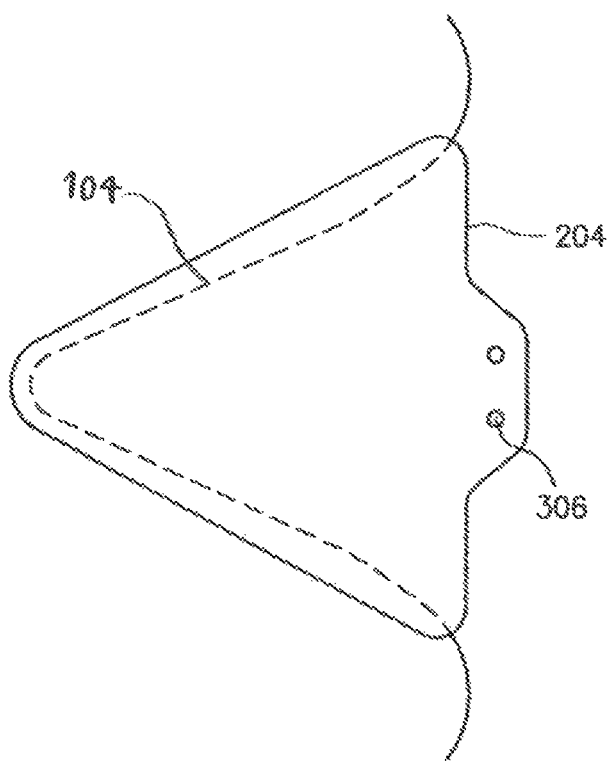
FIG. 3 illustrates the boot of FIG. 2B coupled to chevron of FIGS. 1 and 2A.

As shown in FIG. 3, the boot 204 may be coupled to the chevron 104. For example, the boot 204 may be installed over the chevron 104 and attached to the chevron via an attachment mechanism 306. The attachment mechanism 306 may include bonding or mechanical fasteners, or a combination of the two. The attachment mechanism 306 may be used to electrically connect the boot 204 and the chevron 104 (or other structure of the nacelle 100) for lightning strike protection, as further described below. In some embodiments, one or more materials may be applied to the boot 204 or the chevron 104 in order to attach or couple the boot 204 to the chevron 104.

The boot 204 may be shaped/configured to encapsulate/cover the entirety of the chevron 104, or a portion of the chevron 104. In some embodiments, the boot 204 may include first and second surfaces attached by inwardly tapering sidewalls that form an opening that surrounds the chevron 104. In some embodiments, an interior pocket may be formed that has the same or similar shape as the external surface of the chevron 104 so that when the boot 204 fits over the chevron 104 a tight/snug fit is formed.

The boot 204 may maintain the general shape of the chevrons 104 (being slightly larger and thicker) to not adversely impact aerodynamic performance or acoustic (noise) performance. For example, the exterior surface of the boot 204 may be aerodynamically designed to not effect or alter the original aerodynamics and noise profile of the propulsion system as much as possible. The boot 204 may incorporate pre-fabricated holes to facilitate fastener location and installation.

Figure 4:
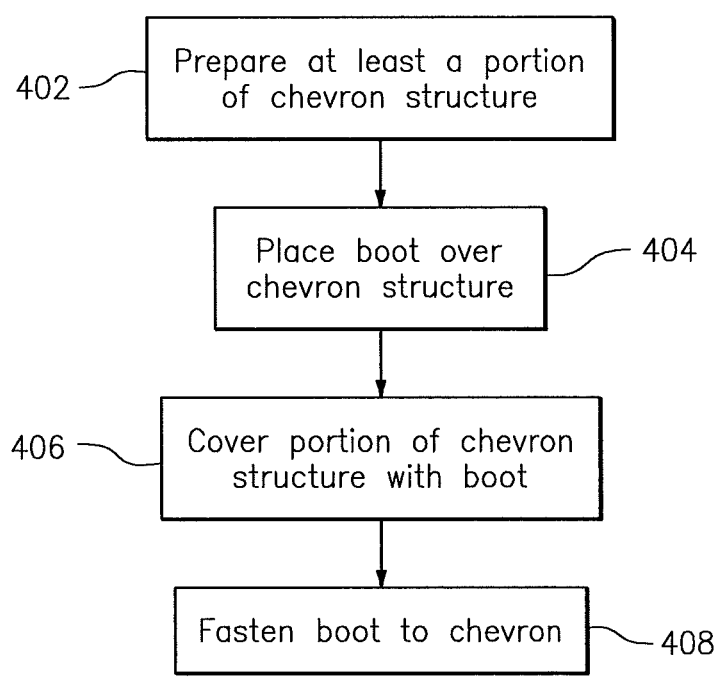
FIG. 4 illustrates a method for repairing a chevron on an exhaust nozzle of an aircraft engine.

The boot 204 may be used to perform a repair or maintenance activity in connection with the chevron 104, where such activity may be undertaken in response to a lightning strike or other impact. For example, FIG. 4 illustrates a method 400 that may be used to repair a chevron on an exhaust nozzle of an aircraft engine.

In block 402, at least a portion of the chevron may be prepared. Such preparation may include cutting off/removing delaminated plies and sanding what is left of the chevron after such removal. In some embodiments, a distal end of the chevron may be trimmed and sanding may be performed with respect to the cut. Alternative techniques for the preparation of block 402 may be used.

In block 404, a chevron-shaped boot with a pocket may be placed over a chevron structure on an exhaust nozzle of an aircraft engine. The pocket may have a shape that generally conforms to the external surface of the chevron.

In block 406, the boot may be used to cover a portion of the chevron, e.g., the portion that is proximate to a lightning strike or other impact. A jig may be used to ensure accurate placement of the boot relative to the chevron. The jig may utilize a portion of the chevron that is not being covered as a frame of reference for purposes of positioning the boot.

In block 408, the boot may be fastened to the chevron through at least one of bonding or mechanical fastening. If bonding is used, a surface of the boot or the chevron may be prepared/cleaned. A bonding agent can be put on the interior pocket of the boot and the "stump" of the chevron. If mechanically fastening, holes can be drilled through pilot holes preformed on the boot and fasteners can be inserted and tightened. Block 408 may include joining an electrically conductive lightning protection feature of the boot to an electrically conductive lightning strike protection feature of the chevron. The joining may include an insertion of an electrically conductive fastener through each feature, or other method.

Referring back to FIGS. 2A-2C and FIG. 3, in some instances the boot 204 may be pre-fabricated and stocked by, e.g., an airline at an airport. Thus, if and when a chevron 104 requires service the boot 204 may be readily available/accessible to perform such service.

The boot 204 may be fabricated using one or more materials and using one or more techniques. For example, the boot 204 may be fabricated via an injection or compression molding of short fiber (e.g., carbon, glass) reinforced plastic material (e.g., thermoplastic or thermoset). The boot 204 may be fabricated via resin transfer molding using a dry continuous fiber (e.g., carbon, glass) preform made using fabric or braided material and a thermoset resin material. The boot 204 may be fabricated as a metal casting. In some embodiments, the boot 204 may include metal, composite, etc. In some embodiments, the boot 204 may include a sheet, mesh or spray coating of an electrically conductive material that may be used to protect the boot 204 against a lightning strike. For example, an aluminum foil, copper mesh, bronze mesh, expanded aluminum foil mesh, or metal flame spray coating may be used as an external or near surface layer coating or layer. In order to electrically connect the conductive lighting protection feature on the boot, the mechanical fastener might be used as a conductor between the boot conductive material and the conductive material used on the chevron "stump" if the fastener makes adequate electrical contact with each layer of conductive material. Alternatively, each layer of conductive material or conductive feature may be exposed by sanding or other surface preparation, and then bonded together and electrically connected through an electrically conductive adhesive.

Technical effects and benefits of the disclosure include obtaining a maximum/increased efficiency in terms of aircraft availability by minimizing/reducing downtime due to service. A chevron may be quickly repaired via the use of a boot that couples to the chevron.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A method of repairing a damaged chevron structure on an exhaust nozzle of an aircraft engine, the damaged chevron structure defining a first end including a first side and a second side which meet at a rounded corner and an opposed second end which extends into two opposed flange portions which are connected to the exhaust nozzle, the method comprising:

providing a repair boot defining a substantially triangular shape defining a first boot end having a first side and a second side which meet at a rounded corner corresponding with the rounded corner of the damaged chevron structure and an opposed second end having an attachment mechanism between two rounded corners, the attachment mechanism defining a flange, the repair boot including a pocket having a shape that conforms to an external surface of the damaged chevron structure;

placing the repair boot with the pocket over at least a portion of the damaged triangular structure on the exhaust nozzle of the aircraft engine;

covering the portion of the damaged triangular structure with the repair boot such that the pocket receives the first end of the damaged chevron structure; and fastening the repair boot to the damaged triangular structure through at least one of bonding or mechanical fastening.

2. The method of claim 1, wherein the repair boot comprises an electrically conductive lightning protection feature.

3. The method of claim 2, further comprising:

joining the electrically conductive lightning protection feature of the repair boot to an electrically conductive lightning strike protection feature of the damaged chevron structure.

4. The method of claim 3, wherein the joining comprises an insertion of an electrically conductive fastener through each of the electrically conductive lightning protection feature and the electrically conductive lightning strike protection feature.

5. The method of claim 1, wherein the fastening comprises fastening the repair boot to the damaged chevron structure through bonding.

6. The method of claim 1, wherein the fastening comprises fastening the repair boot to the damaged chevron structure using a fastener.

7. The method of claim 1, wherein the damaged chevron structure comprises at least two laminates bonded onto a core material.

8. The method of claim 1, further comprising fabricating the repair boot by injection or compression molding fiber reinforced plastic material.

9. The method of claim 1, further comprising fabricating the repair boot by resin transfer molding using a dry continuous fiber preform made using at least one of fabric or braided material and a thermoset resin material.

10. The method of claim 1, wherein the repair boot comprises metal.

11. The method of claim 1, wherein the repair boot comprises composite material.

12. The method of claim 1, wherein the repair boot comprises at least one of a mesh or spray coating configured to protect the boot against a lightning strike.

13. The method of claim 1, wherein the covering comprises encapsulating an entirety of the damaged chevron structure with the repair boot.

14. The method of claim 1, wherein the repair boot comprises a first side section and a second side section; and edges of the first side section are respectively connected to edges of the second side section thereby forming the pocket between the first side section and the second side section.

* * * * *